US011552396B2

(12) United States Patent
Wang et al.

(10) Patent No.: US 11,552,396 B2
(45) Date of Patent: Jan. 10, 2023

(54) PHASE SHIFTER, REMOTE ELECTRICAL TILT SYSTEM AND BASE STATION ANTENNA

(71) Applicant: CommScope Technologies LLC, Hickory, NC (US)

(72) Inventors: Yiding Wang, Jiangsu (CN); PuLiang Tang, Jiangsu (CN); Changfu Chen, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/369,221

(22) Filed: Jul. 7, 2021

(65) Prior Publication Data

US 2022/0029288 A1 Jan. 27, 2022

(30) Foreign Application Priority Data

Jul. 24, 2020 (CN) ......................... 202010725727.1

(51) Int. Cl.

*H01Q 1/22* (2006.01)
*H01Q 3/30* (2006.01)
*H04B 7/04* (2017.01)
*H01Q 3/32* (2006.01)
*H01Q 1/24* (2006.01)

(52) U.S. Cl.

CPC ............... *H01Q 3/32* (2013.01); *H01Q 1/246* (2013.01)

(58) Field of Classification Search

CPC ............ H01Q 1/246; H01Q 3/30; H01Q 3/32; H01Q 1/22; H04B 1/10; H04B 1/1009; H04B 7/04; H04B 7/084

See application file for complete search history.

(56) References Cited

U.S. PATENT DOCUMENTS 5,512,914 A * 4/1996 Hadzoglou ............ H01Q 21/10 343/792
6,445,353 B1 * 9/2002 Weinbrenner ......... H05B 45/38 343/766

FOREIGN PATENT DOCUMENTS

CN 110931980 A * 3/2020 ................ H01P 1/18
CN 111816958 A * 10/2020 ................ H01P 1/18

(Continued)

*Primary Examiner* — Blane J Jackson

(74) *Attorney, Agent, or Firm* — Myers Bigel, P.A.

(57) ABSTRACT

The present disclosure relates to a phase shifter, which includes: a phase shift circuit board with conductive traces printed thereon; and a phase shift circuit board with conductive traces printed thereon; and a slide device with a first tooth section configured to be driven, wherein movement of the first tooth section drives the slide device to slide on the phase shift circuit board. In addition, the present disclosure further relates to a remote electrical tilt system, which includes an actuator, a transmission mechanism, and at least one phase shifter according to the present disclosure, wherein the actuator is configured to drive the transmission mechanism, and the transmission mechanism engages the first tooth section to drive the slide device to slide on the phase shift circuit board. In addition, the present disclosure also relates to a base station antenna which includes the remote electrical tilt system according to the present disclosure. The base station antenna according to the present disclosure may improve the stability of the transmission of the remote electrical tilt system and increase the space utilization of the remote electrical tilt system.

17 Claims, 7 Drawing Sheets

(56) References Cited

FOREIGN PATENT DOCUMENTS

| | | | | | |
|---|---|---|---|---|---|
| EP | 3588670 | A1 | * | 1/2020 | .............. H01P 1/184 |
| KR | 369221 | B1 | * | 4/2003 | ............... B05D 1/36 |
| WO | WO-2018135831 | A1 | * | 7/2018 | ................ H01P 1/18 |
| WO | WO-2018159973 | A1 | * | 9/2018 | ................ H01P 1/18 |
| WO | WO-2019066308 | A1 | * | 4/2019 | ................ H01P 1/18 |

* cited by examiner

100

PHASE SHIFTER, REMOTE ELECTRICAL TILT SYSTEM AND BASE STATION ANTENNA

RELATED APPLICATION

The present application claims priority from and the benefit of Chinese Application No. 202010725727.1, filed Jul. 24, 2020, the disclosure of which is hereby incorporated herein by reference in full.

FIELD OF THE INVENTION

The present disclosure generally relates to the field of base station antennas, and more particularly, to a phase shifter, a remote electrical tilt system with a phase shifter, and a base station antenna with a remote electrical tilt system.

BACKGROUND OF THE INVENTION

Currently, the remote electrical tilt antenna (RET antenna) is widely used as a base station antenna in cellular communication systems. Before introducing the RET antenna, when it was necessary to adjust the coverage area of the traditional base station antenna, the technician had to climb the antenna tower with the antenna installed and manually adjust the antenna's pointing angle. Generally, the coverage area of the antenna is adjusted by changing the so-called "tilt angle" of the antenna, which is the angle in the elevation plane of the visual axis pointing direction of the antenna beam generated by the antenna. The introduction of the RET antenna allows cellular operators to electrically adjust the tilt angle of the antenna beam by sending control signals to the antenna.

The RET antenna further includes a RET system, which allows the cellular operator to dynamically adjust the tilt angle of the antenna beam. The RET system usually includes a drive motor, a transmission mechanism, and a phase shifter for each array of radiating elements. Many modern base station antennas include multiple arrays of radiating elements, and each array usually has associated drive motor, transmission mechanism and phase shifter, which makes the antenna structural arrangement complicated. Therefore, improving the space utilization of the antenna is an urgent problem to be solved. In addition, the stability of the transmission in the RET system should also be improved.

SUMMARY OF THE INVENTION

Therefore, the object of the present disclosure is to provide a phase shifter, a remote electrical tilt system with a phase shifter and related base station antennas for overcoming at least one defect in the prior art.

The first aspect of the present disclosure is to provide a phase shifter, which comprises: a phase shift circuit board with conductive traces printed thereon; and a slide device with a first tooth section configured to be driven, wherein movement of the first tooth section drives the slide device to slide on the phase shift circuit board.

According to the present disclosure, the stability of the transmission of the remote electrical tilt system may be improved and the space utilization of the remote electrical tilt system may be increased.

In some embodiments, the first tooth section is configured as a sector gear section.

In some embodiments, an arc profile of the sector gear section extends following an arc trajectory of the conductive trace.

In some embodiments, the slide device is rotatably mounted on the phase shift circuit board by means of a pivot shaft.

In some embodiments, the slide device includes a slider and a slider support, and the slider is supported on the slider support.

In some embodiments, the first tooth section is configured on the slider support.

In some embodiments, the slider is configured as a slide circuit board, on which a first coupling part coupled to the input port of the phase shift circuit board and a second coupling part coupled to a respective conductive trace are printed.

In some embodiments, the phase shift circuit board comprises: an input port which is configured to receive a RF signal; a first output port and a second output port respectively configured to output a corresponding phase-shifted sub-component of the RF signal; a first conductive trace which extends in a first direction and is coupled to the first output port and the second output port, and the slide device is configured to couple the input port to the first conductive trace and is able to slide with respect to the first conductive trace in the first direction.

A second aspect of the present disclosure is to provide remote electrical tilt system, which comprises an actuator, a transmission mechanism, and at least one phase shifter of any one of embodiments, wherein the actuator is configured to drive the transmission mechanism, and the transmission mechanism engages the first tooth section to drive the slide device to slide on the phase shift circuit board.

In some embodiments, the transmission mechanism includes a slider linkage configured with a second tooth section, and the slider linkage is configured to drive the slide device to slide on the phase shift circuit board by means of the engagement between the first tooth section of the slide device and the second tooth section of the slider linkage.

In some embodiments, the slider linkage is formed in a rack shape, and the slider support is formed in a sector gear shape, thereby forming a rack-gear transmission between the slider linkage and the slider support.

In some embodiments, the transmission mechanism includes a control rod which is configured to drive the slider linkage.

In some embodiments, the slider linkage is mounted on the control rod.

In some embodiments, the slider linkage is mounted on the control rod in a form-fitting manner.

In some embodiments, the slider linkage has an engaging portion, the control rod has a mating engaging portion, and the engaging portion is able to be embedded into the mating engaging portion in a form-fitting manner.

In some embodiments, the slider linkage is formed as a part of the control rod.

In some embodiments, the remote electrical tilt system includes a rail, and the control rod and the slider linkage are configured to be movable along the rail.

In some embodiments, the remote electrical tilt system further includes a bracket mounted on a base plate for supporting the rail.

In some embodiments, the bracket has a through slot, and the control rod is configured to extend into the rail through the through slot.

In some embodiments, the remote electrical tilt system includes a first bracket and a second bracket spaced apart from the first bracket, and the rail is supported between the first bracket and the second bracket.

In some embodiments, the control rod is driven by the actuator.

In some embodiments, the remote electrical tilt system includes a plurality of phase shifters respectively mounted on at least one base plate, and the transmission mechanism is configured to drive each slide device to slide on respective phase shift circuit board.

In some embodiments, the transmission mechanism includes one control rod configured to drive each slide linkage for each slide device.

In some embodiments, the remote electrical tilt system includes a first base plate, a first phase shifter and a second phase shifter mounted on the first base plate, wherein the first phase shifter has a first slide device, the second phase shifter has a second slide device, and the first tooth section of the first slide device and the first tooth section of the second slide device face each other.

In some embodiments, there is a gap between the first tooth section of the first slide device and the first tooth section of the second slide device, the slider linkage is able to be inserted into the gap, both sides of the slider linkage are respectively provided with second tooth sections, and the second tooth sections on both sides of the slider linkage are respectively engaged with the first tooth sections of the first and second slide device.

In some embodiments, the remote electrical tilt system includes a first base plate, at least one phase shifter mounted on the first base plate, a second base plate, and at least one phase shifter mounted on the second base plate.

In some embodiments, the first base plate and the second base plate are stacked one above the other.

In some embodiments, the transmission mechanism includes a control rod, a first slide linkage for driving the slide device of the phase shifter on the first base plate and a second slide linkage for driving the slide device of the phase shifter on the second base plate, wherein the control rod is able to drive the first slide linkage, and the first slide linkage is able to drive the second slide linkage.

In some embodiments, the first slide linkage is provided with a first engaging portion configured to engage with a first mating engaging portion on the control rod, and the first slide linkage is provided with a second engaging portion configured to engage with a second mating engaging portion on the second slide linkage.

In some embodiments, the first base plate is provided with a gap portion, and the second engaging portion is able to be embedded into the second mating engaging portion through the gap portion.

In some embodiments, the remote electrical tilt system includes a first rail, the control rod and the first slide linkage is configured to be movable along the first rail, and the first rail is supported on a bracket mounted on the first base plate, the remote electrical tilt system further includes a second rail, the second slide linkage is configured to be movable along the second rail, and the second rail is supported on a bracket mounted on the second base plate.

In some embodiments, the first base plate and the second base plate are horizontally placed.

In some embodiments, the transmission mechanism includes a control rod, a first slide linkage for driving the slide device of the phase shifter on the first base plate and a second slide linkage for driving the slide device of the phase shifter on the second base plate, wherein the control rod is able to drive the first slide linkage and the second slide linkage.

In some embodiments, the first slide linkage is provided with a first engaging portion configured to engage with a first mating engaging portion on the control rod, and the second slide linkage is provided with a second engaging portion configured to engage with a second mating engaging portion on the control rod.

In some embodiments, the engaging portion is configured as a convex portion and the mating engaging portion is configured as a groove; or the engaging portion is configured as a groove and the mating engaging portion is configured as a convex portion.

A third aspect of the present disclosure is to provide base station antenna, which comprises the remote electrical tilt system of any one of embodiments.

BRIEF DESCRIPTION OF THE DRAWINGS

The present disclosure will be explained in more detail below with reference to the accompanying drawings by means of specific embodiments. The schematic drawings are briefly described as follows.

DETAILED DESCRIPTION

Figure 1B:
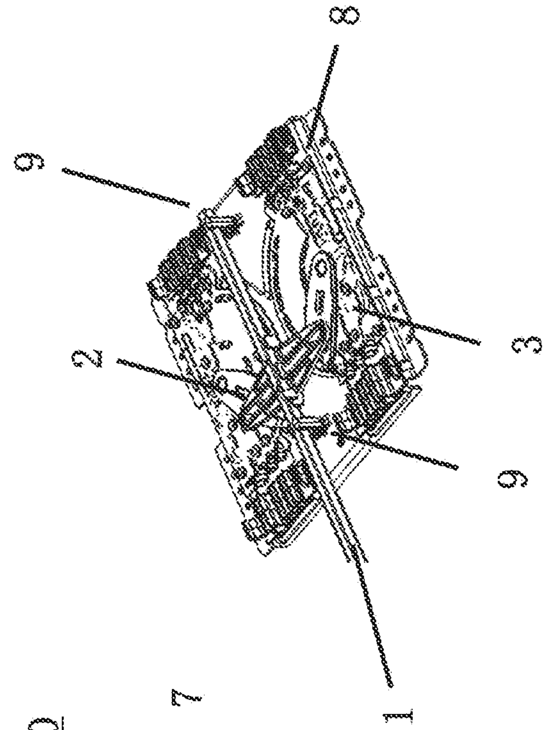
FIG. 1*b* is a perspective view of the RET system of FIG. 1*a;*

The present disclosure will be described with reference to the accompanying drawings, which show a number of example embodiments thereof. It should be understood, however, that the present disclosure may be embodied in many different ways, and is not limited to the embodiments described below. Rather, the embodiments described below are intended to make the present disclosure of the present disclosure more complete and fully convey the scope of the present disclosure to those skilled in the art. It should also be understood that the embodiments disclosed herein may be combined in any way to provide many additional embodiments.

It should also be understood that the terminology used herein is for the purpose of describing particular embodiments, but is not intended to limit the scope of the present disclosure. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element may be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element may mean that the first element has a part that overlaps the second element or a part that is located above or below the second element.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature may be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the preceding technical field, background, summary, or detailed description.

Herein, the term "substantially", is intended to encompass any slight variations due to design or manufacturing imperfections, device or component tolerances, environmental effects, and/or other factors.

Herein, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Figure 1A:
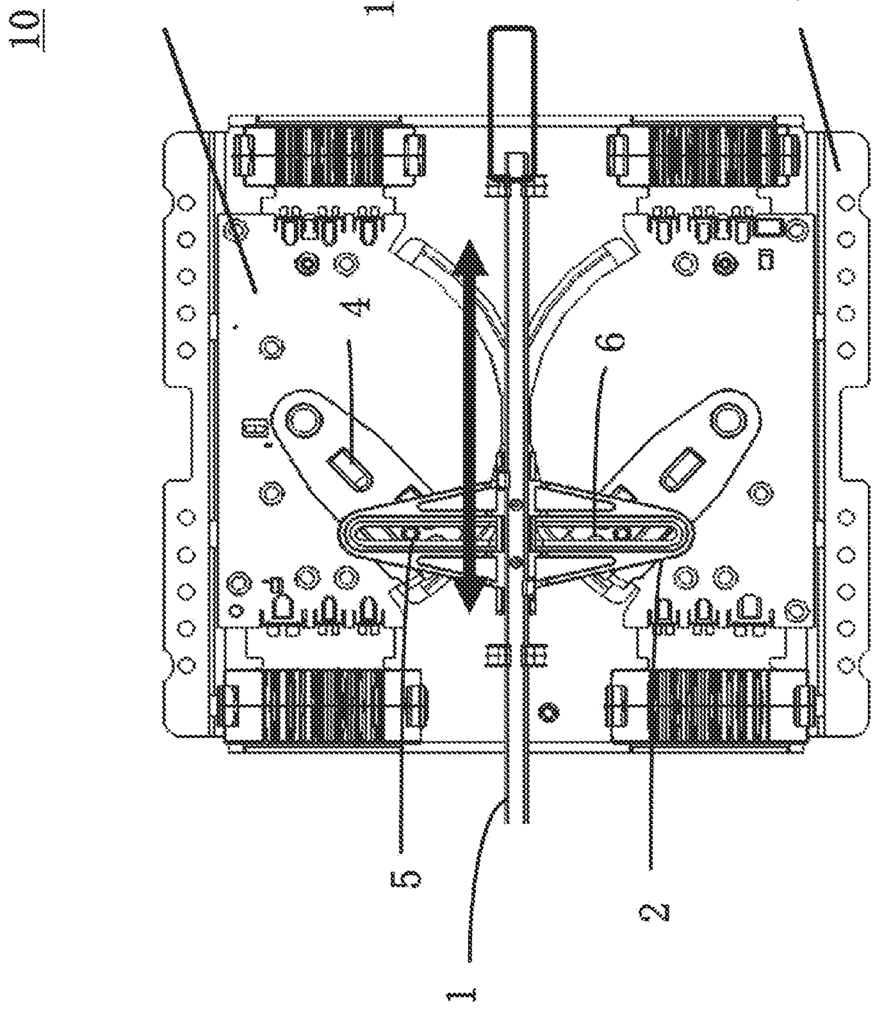
FIG. 1*a* is a front view of a traditional RET system.

FIGS. 1*a* and 1*b* are a front view and a perspective view of a traditional RET system 10, respectively. As shown in FIGS. 1*a* and 1*b*, the traditional RET system 10 may include a drive motor (not shown), a transmission mechanism, and a phase shifter 3 for the array of radiating elements. When cross-polarized radiating elements are used, two phase shifters 3 may be provided for one array of radiating elements to adjust the phases of the sub-components of the two polarized RF signals. Both phase shifters 3 may be mounted on one base plate 8 in common. The transmission mechanism of the traditional RET system 10 may include a control rod 1 and a slider linkage 2 mounted on the control rod 1. The slider linkage 2 may have an elongate slot 6. A pin 5 of the slide device 4 of the phase shifter 3 extends into the elongated slot 6. When the control rod 1 is driven by the motor, the control rod 1 will drive the slider linkage 2, and the slider linkage 2 may drive the slide device 4 to slide on a main circuit board 7 (that is, a phase shift circuit board with conductive traces printed thereon) of the phase shifter 3, to change the phases of the sub-components of the RF signals and adjust the electrical tilt angle.

In addition, the performance of the phase shifter 3 is sensitive to pressure, because once the control rod 1 is tilted during the movement, it will increase the contact pressure between the slide device 4 of the phase shifter 3 and the main circuit board 7, and the increased contact pressure will not only damage the phase shifter 3, but also affect the phase shift performance of the phase shifter 3 and cause an increase in Return Loss. Therefore, it is necessary to ensure stable movement of the control rod 1 and the slider linkage 2. For this, at least two brackets 9 may be installed on the base plate to stably support the control rod 1.

However, in the traditional RET system 10, the control rod 1 needs a reserved extra space (identified by a box in FIG. 1*a*). This extra space presents challenges to the spatial design of a base station antenna. Especially, as more and more devices are integrated into the base station antenna, this extra space is undesirable. Even in some application scenarios, this extra space is not allowed. In addition, since the slide device 4 needs a large pulling force as the deflection angle of the slide device 4 increases, the forces of the control rod 1 and the slider linkage 2 are not balanced throughout the entire stroke.

Figure 2:
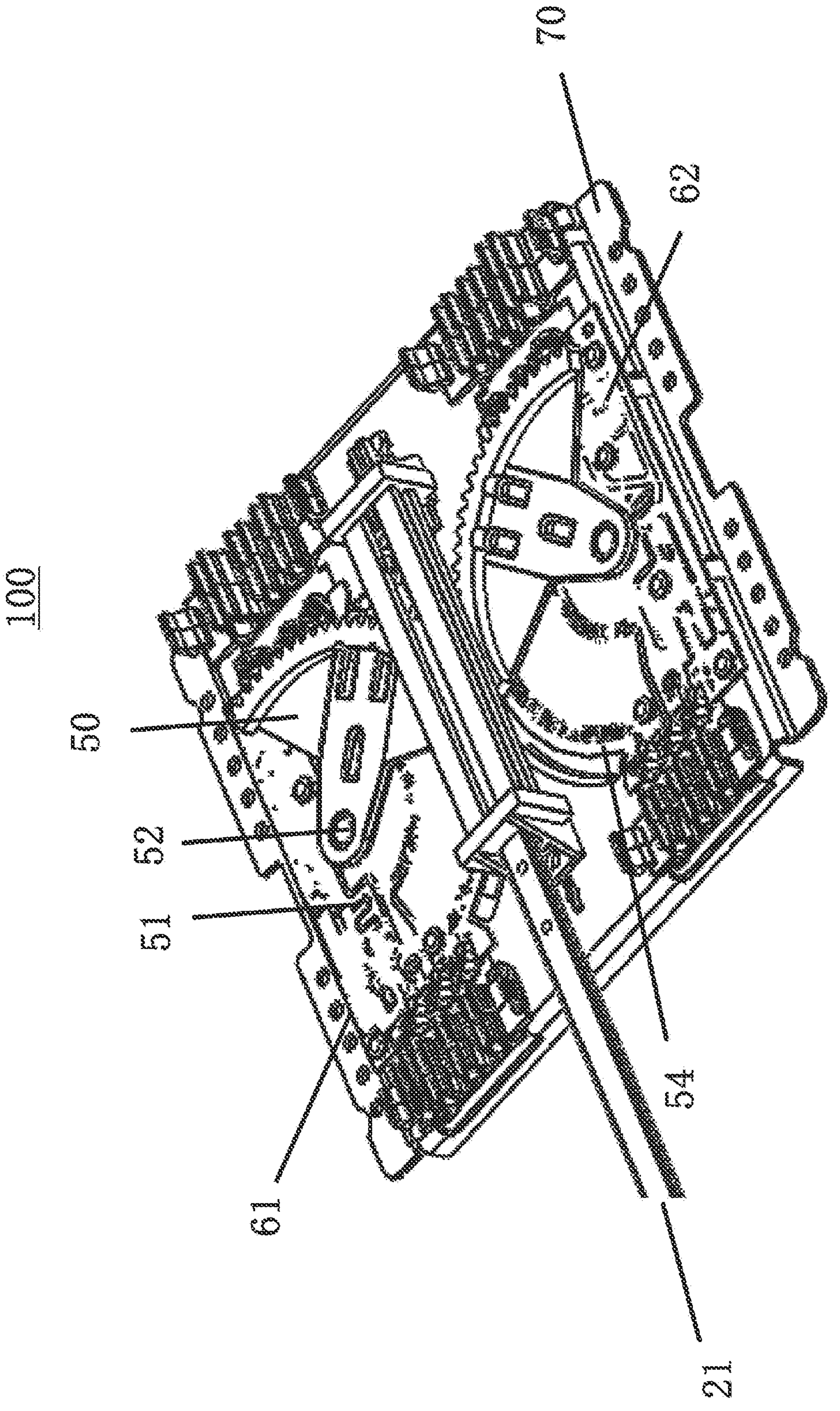
FIG. 2 is a perspective view of an RET system according to some embodiments of the present disclosure.
Figure 3:
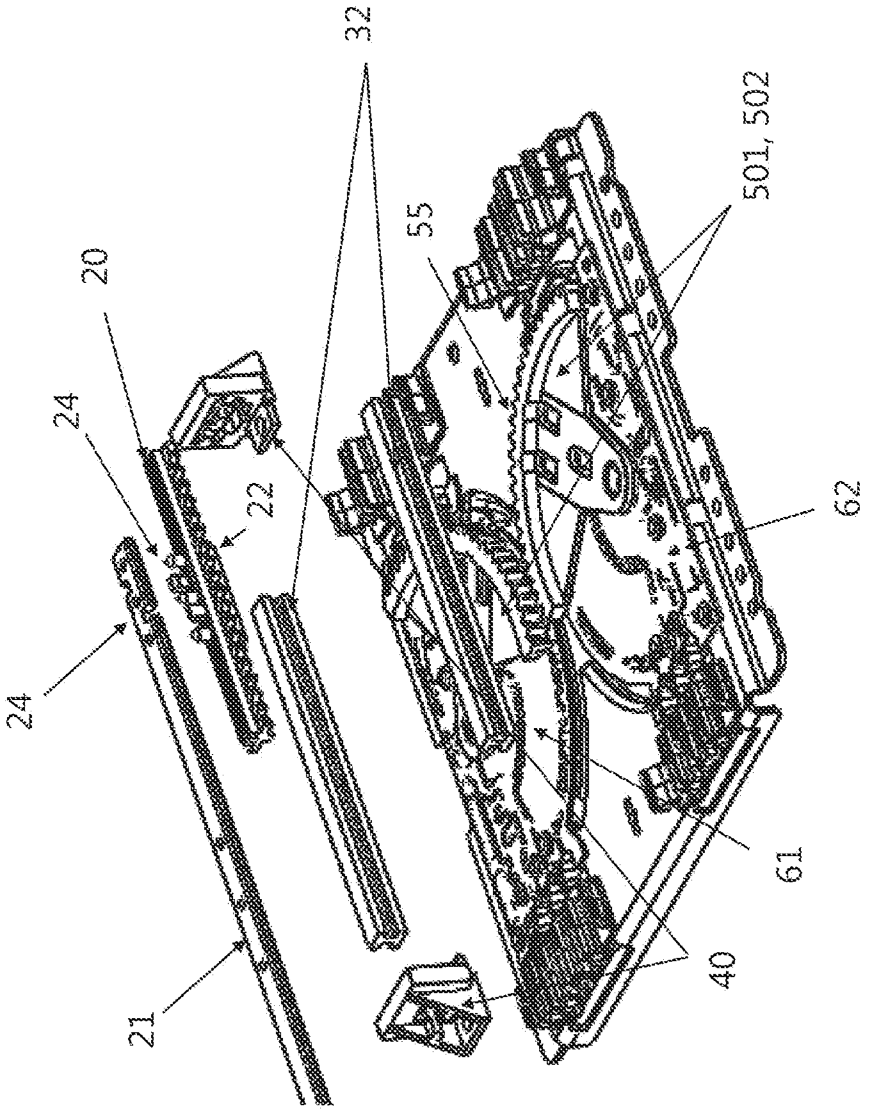
FIG. 3 is an exploded view of the RET system of FIG. 2.
Figure 4A:
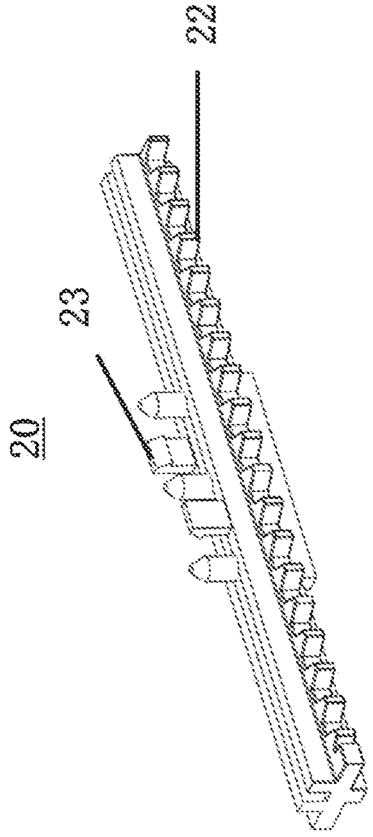
FIG. 4*a* is a perspective view of a slider linkage of the RET system of FIG. 2.
Figure 4B:
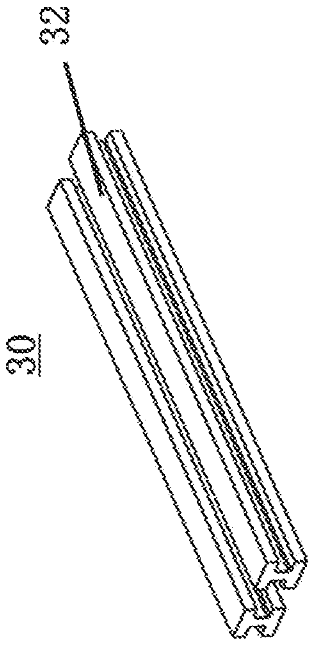
FIG. 4*b* is a perspective view of the rail of the RET system of FIG. 2.
Figure 4C:
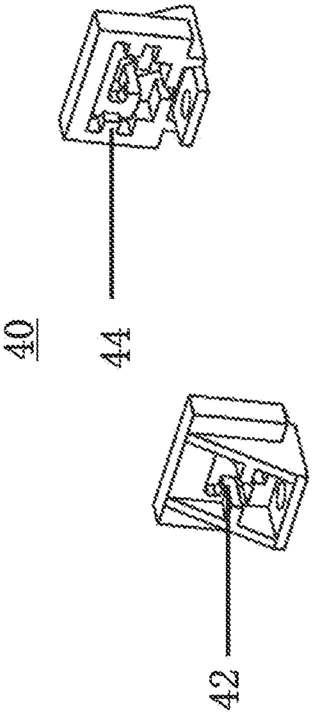
FIG. 4*c* is a perspective view of the brackets of the RET system of FIG. 2.

Next, the RET system 100 according to some embodiments of the present disclosure will be described in detail with the aid of FIGS. 2 and 3, and FIGS. 4*a* to 4*d*. FIGS. 2 and 3 are a perspective view and an exploded view of an RET system according to some embodiments of the present disclosure. FIG. 4*a* is a perspective view of the slider linkage 20; FIG. 4*b* is a perspective view of the rail 30; FIG. 4*c* is a perspective view of the bracket 40; and FIG. 4*d* is a perspective view of the slide device 50.

As shown in FIGS. 2 and 3, the RET system 100 may include a drive motor (not shown), a transmission mechanism and phase shifter for an array of radiating elements. The RET system 100 may include multiple phase shifters. In the current embodiment, the RET system 100 may include a first phase shifter 61 and a second phase shifter 62 mounted on a base plate 70, and the two phase shifters may be configured to adjust the phases of the sub-components of the two polarized RF signals. Each phase shifter may include a slide device 50 and a phase shift circuit board 51. The slide device 50 is rotatably mounted on the phase shift circuit board 51 by means of a pivot shaft 52. The phase shift circuit board 51 includes an input port, a plurality of output ports, and conductive traces 54 respectively coupled to two of the output ports. The slide device 50 is configured to couple the input port to the respective conductive traces 54 and may slide with respect to the conductive traces 54 to change the phase change experienced by the sub-components of the RF signal from the input port to the corresponding output port.

Referring to FIG. 3, the transmission mechanism of the RET system 100 may include a control rod 21 and a slider linkage 20. A motor as an actuator may be configured to drive the control rod 21. The driven control rod 21 may drive the slider linkage 20, and the slider linkage 20 drives the slide device 50 to pivot on the phase shift circuit board 51. In order to realize a more stable transmission, a rack-gear transmission may be used between the slider linkage 20 and the slide device 50. In this regard, the slide device 50 may be configured with a sector gear section as a first tooth section 55, and the slider linkage 20 may be configured with a rack section as a second tooth section 22; transmission with a more uniform torque may be realized through the meshing transmission between the first tooth section 55 and the second tooth section 22.

Figure 4D:
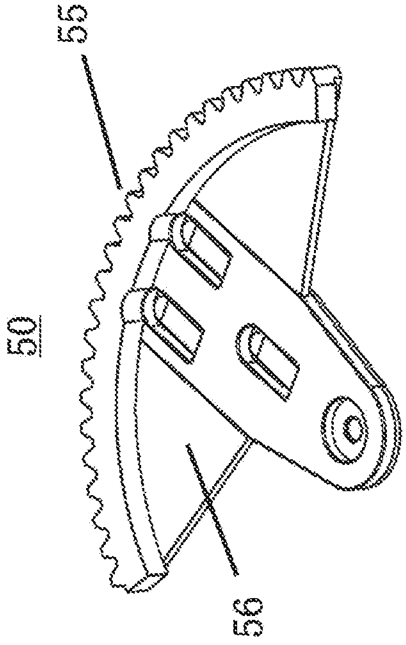
FIG. 4*d* is a perspective view of the slider support of the RET system of FIG. 2.

Referring to FIG. 4*d*, the slide device 50 may include a slider (not shown because it is on the back side of the slide device 50) and a slider support 56. The slider may be configured as a slide circuit board printed with a first coupling part coupled to the input port and a second coupling part coupled to the corresponding conductive traces 54 respectively. The slider may be supported, for example, by being snapped on the slider support 56 made of a dielectric material. In some embodiments, the slider support 56 may be constructed as a plastic member. In the current embodiment, the slider support 56 may be configured with a sector gear section and cooperate with the rack section of the slider linkage 20. It should be understood that the structure of the slide device 50 may be various, and in some embodiments, the slider itself may be configured with tooth sections.

In the embodiment of FIG. 3, the RET system 100 may include a first phase shifter 61 and a second phase shifter 62 mounted on a base plate 70, wherein the first phase shifter 61 has a first slide device 501, and the second phase shifter 62 has a second slide device 502. In order to drive the first slide device 501 and the second slide device 502 at the same time, the slider linkage 20 may be provided with second tooth sections 22 on both sides thereof. The first tooth section 55 of the first slide device 501 and the first tooth section 55 of the second slide device 502 towards each other with a gap or a channel therebetween, and the slider linkage 20 may extend into the gap to engage respectively with the first tooth sections 55 of the two slide devices 50 by means of its own second tooth section 22.

Referring still to FIG. 3, the RET system 100 may further include a rail 30 and a bracket 40 as shown in FIG. 4*c* mounted on the base plate 70 for supporting the rail 30. In the current embodiment, the RET system 100 may include a first bracket 40 and a second bracket 40 spaced apart from the first bracket 40. The rail 30 may be bridged between the two brackets 40 and provide support for the control rod 21 together with the slider linkage 20. The distance between the two brackets 40 or the length of the rail 30 may substantially correspond to the complete stroke of the control rod 21. Thereby, the control rod 21 does not need to move out of the bracket 40 or at least less outside of the bracket 40, so that the extra space reserved for the stroke of the control rod 21 shown in FIG. 1*a* may be avoided or at least reduced.

Referring to FIG. 3 and FIG. 4*c*, the bracket 40 may be provided with a through slot 42, wherein the control rod 21 is configured to be able to pass through the through slot 42 and extend into the rail 30. Referring to FIG. 4*b*, the rail 30 may be configured as two separate work profiles 32. The two work profiles 32 may be inserted into the receiving slot 44 on the bracket 40 and fixed in the receiving slot 44. The control rod 21 together with the slider linkage 20 may extend into the rail 30 formed by the two work profiles 32 and move smoothly along the rail 30. In other embodiments, the rail 30 may be configured into any other suitable structure, and the shape and size of the rail 30 may be adaptively changed according to the design of the control rod 21 and/or the slider linkage 20. In other embodiments, the rail 30 may also be configured in one piece. The reliable and stable support by the rail 30 further improves the stable movement of the control rod 21 and the slider linkage 20, so that a large fluctuation in the contact pressure between the slide device 50 and the main circuit board due to the unstable movement of the control rod 21 are prevented, thus maintaining the performance of the phase shifter 60 at an acceptable level.

In the current embodiment, the slider linkage 20 may be mounted on the control rod 21 as a separate member. For example, the slider linkage 20 may be mounted on the control rod 21 in a form-fitting manner. As shown in FIG. 4*a*, the slider linkage 20 has a convex portion 23 as an engaging portion in addition to the tooth sections provided on both sides thereof, and the convex portion 23 may be fitted on the control rod 21 to match the engaging portion thereof, that is, the groove 24. In some embodiments, the slider linkage 20 may be provided with a groove, and the control rod 21 may be provided with a convex portion. In other embodiments, the slider linkage 20 may be mounted on the control rod 21 by any other suitable joining method, for example, by material joining methods such as welding, or by additional fastening means such as rivets or screws. In other embodiments, the slider linkage 20 may be integrally formed with and configured as part of the control rod 21.

Figure 5:
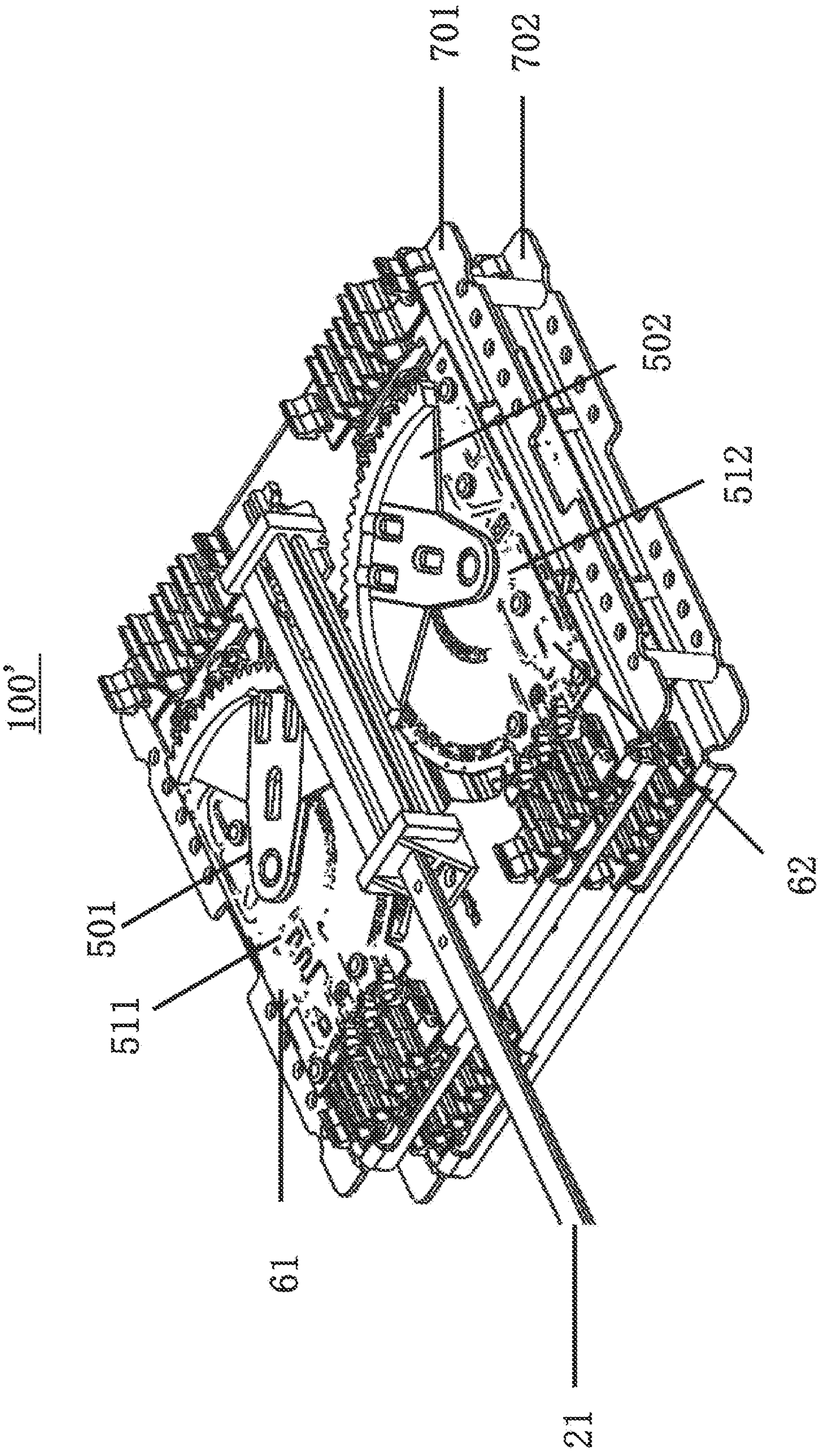
FIG. 5 is a perspective view of the RET system according to some embodiments of the present disclosure.
Figure 6:
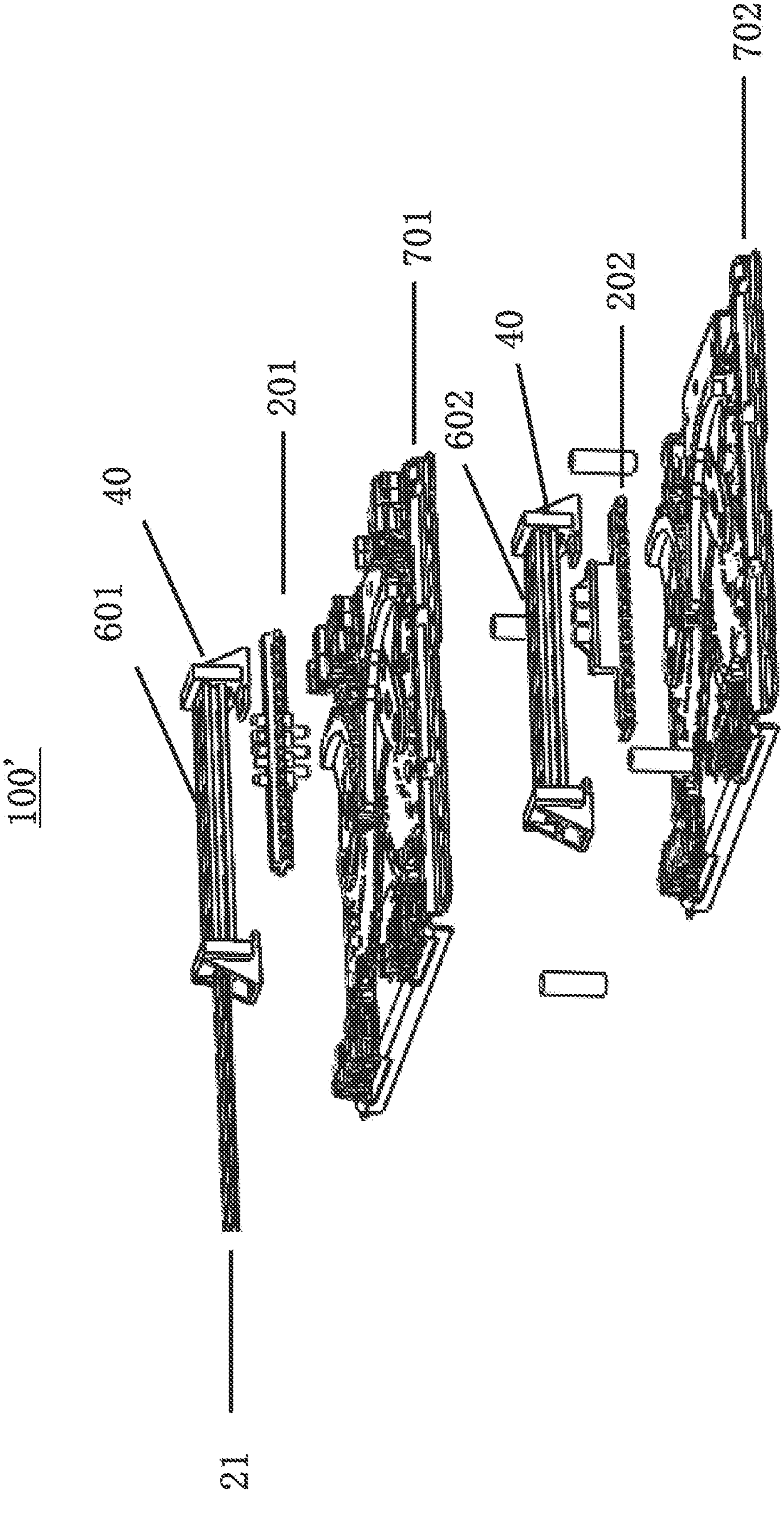
FIG. 6 is an exploded view of the RET system of FIG. 5.
Figure 7A:
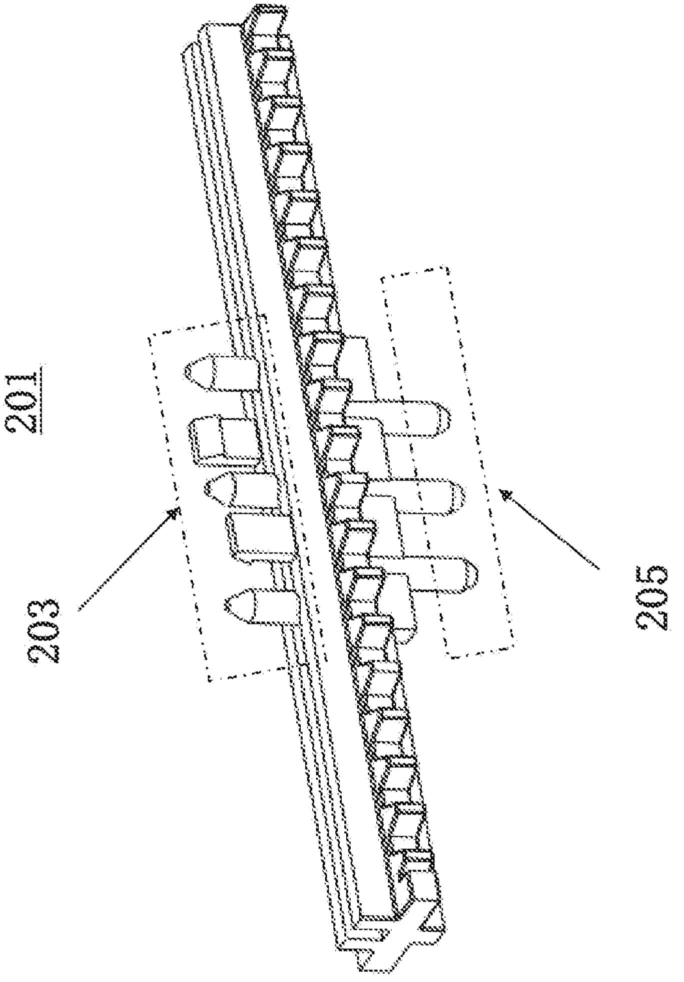
FIG. 7*a* is a perspective view of the first slide linkage of the RET system of FIG. 5.
Figure 7B:
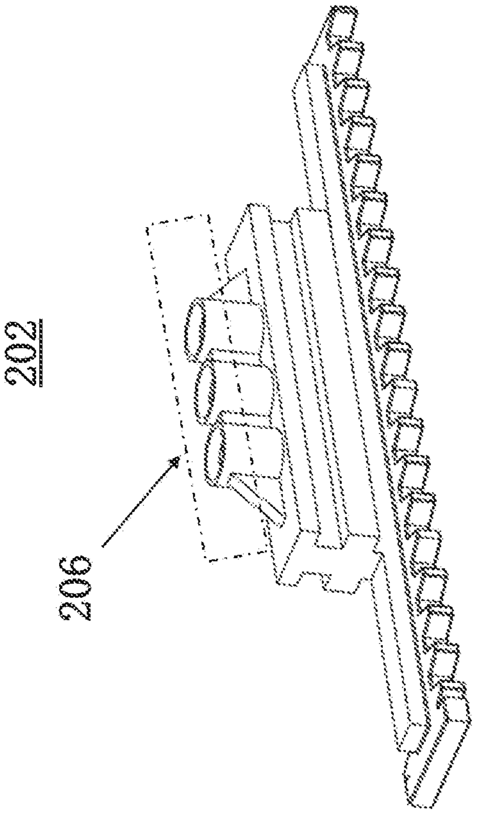
FIG. 7*b* is a perspective view of the second slide linkage of the RET system of FIG. 5.

Next, the RET system 100' according to some embodiments of the present disclosure will be described in detail with reference to FIGS. 5, 6, 7*a*, and 7*b*. FIG. 5 is a perspective view of the RET system 100'; FIG. 6 is an exploded view of the RET system 100'; FIG. 7*a* is a perspective view of the first slide linkage 201 of the RET system 100'; FIG. 7*b* is a perspective view of the second slide linkage 202 of the RET system 100'.

In the actual operation of a base station antenna, it may be necessary to implement a synchronized phase shift operation on two or more arrays of radiating elements. In this case, the RET system 100' may include a plurality of base plates, and each base plate may have at least one phase shifter.

As shown in FIGS. 5 and 6, the RET system 100' may have a first base plate 701 and a second base plate 702. For example, a first phase shifter 61 and a second phase shifter 62 for the two polarized RF signals are mounted on the first base plate 701. The first phase shifter 61 has a first slide device 501 and a first phase shift circuit board 511, and the second phase shifter 62 has a second slide device 502 and a second phase shift circuit board 512. In the current embodiment, the first base plate 701 and the second base plate 702 may be stacked on top of each other, thereby improving the compact structure of the antenna. Of course, in other embodiments, the first base plate 701 and the second base plate 702 may also lie horizontally to each other. As for the specific structure of the phase shift circuit boards 511, 512 and the slide device 501, 502, reference may be made to the content described for FIGS. 2 to 4*d*, which will not be repeated here. Next, the transmission mechanism of the RET system 100' according to this embodiment will be described in detail.

Referring to FIG. 6, the transmission mechanism may include a control rod 21, a first slide linkage 201 for driving the first slide device 501 and a second slide linkage 202 for driving the second slide device 502. A motor may be used for driving the control rod 21 (typically only one) as a driving device, and the control rod 21 may drive the first slide linkage 201. The first slide linkage 201 further drives the first slide device 501 to pivot on the first phase shift circuit board 511. In addition, the first slide linkage 201 may further drive the second slide linkage 202, so that the second slide linkage 202 further drives the second slide device 502 to pivot on the second phase shift circuit board 512. In order to achieve a more stable transmission, the rack-gear transmission as already described above may be used between the first slide linkage 201 and the first slide device 501 and/or between the second slide linkage 202 and the second slide device 502.

Referring still to FIG. 6, the RET system 100' may further include a first rail 601 and a second rail 602. The control rod 21 and the first slide linkage 201 may move along the first rail 601, and the first rail 601 is supported on a bracket 40 mounted on the first base plate 701. The second slide linkage 202 may move along the second rail 602, and the second rail 202 is supported on the bracket 40 mounted on the second base plate 702. Thereby, the control rod 21 does not need to move out of the bracket 40 or at least less outside the bracket 40, so that the extra space reserved for the stroke of the control rod 21 shown in FIG. 1*a* may be avoided or at least reduced.

Referring to FIGS. 7*a* and 7B, the first slide linkage 201 may be provided with a first convex portion 203 as the first engaging portion, the first convex portion 203 is configured to be engaged with the groove on the control rod 21, so that they form a reliable first matching structure. In addition, the first slide linkage 201 may be further provided with a second convex portion 205 as the second engaging portion, and the second convex portion 205 may be embedded into the gap portion on the first base plate 701 to fit in the groove 206 on the second slide linkage 202, so that they form a reliable second mating structure. The first matching structure and the second matching structure enable the control rod 21 to drive the slider linkages 201 and 202 on different base plates 701 and 702. It should be understood that the first slide linkage 201 may be mounted on the control rod 21 by any other suitable joining method, for example by material joining method such as welding or by additional fastening means such as rivets or screws. Similarly, the second slide linkage 202 may be mounted on the first slide linkage 201 by any other suitable joining method, for example, by material joining methods such as welding, or by additional fastening devices such as rivets or screws. In other embodiments, the first slide linkage 201 and the second slide linkage 202 may be integrally formed with the control rod 21.

In some embodiments, the first base plate and the second base plate may lie horizontally. In this case, the transmission mechanism may include a control rod (typically only one), a first slide linkage for driving the slide device of the phase shifter on the first base plate, and a second slide linkage for driving the slide device of the phase shifter on the second base plate. The control rod may drive the first slide linkage and the second slide linkage. The first slide linkage may be provided with a first engaging portion configured to engage with a first mating engaging portion on the control rod, and the second slide linkage is provided with a second engaging portion configured to engage with the second mating engaging portion on the control rod, thereby achieving reliable transmission. It should be understood that according to some embodiments of the present disclosure, the RET system 100, 100' may drive a plurality of slide linkages 20 through a control rod 21 driven by a motor, the plurality of slide linkages 20 may accordingly drive the associated slide device 50 to perform a synchronized phase shift operation for each phase shifter 60.

Although exemplary embodiments of the present disclosure have been described, it should be understood by a person skilled in the art that, various changes and modifications can be made to the exemplary embodiments of the present disclosure without substantially departing from the spirit and scope of the present disclosure. Therefore, all changes and modifications are included in the protection scope of the present disclosure as defined by the claims. This disclosure is defined by the appended claims, and the equivalents of these claims are also included.

What is claimed:

1. A remote electrical tilt system, which comprises an actuator, a transmission mechanism, and at least one phase shifter, the phase shifter comprising:

a phase shift circuit board with conductive traces printed thereon; and a slide device with a first tooth section configured to be driven, wherein movement of the first tooth section drives the slide device to slide on the phase shift circuit board;

wherein the actuator is configured to drive the transmission mechanism, and the transmission mechanism engages the first tooth section to drive the slide device to slide on the phase shift circuit board; and wherein the transmission mechanism includes a slider linkage configured with a second tooth section, and the slider linkage is configured to drive the slide device to slide on the phase shift circuit board via the engagement between the first tooth section of the slide device and the second tooth section of the slider linkage.

2. The remote electrical tilt system of claim 1, wherein the slider linkage is formed in a rack shape, and the slider support is formed in a sector gear shape, thereby forming a rack-gear transmission between the slider linkage and the slider support.

3. The remote electrical tilt system of claim 1, wherein the transmission mechanism includes a control rod which is configured to drive the slider linkage.

4. The remote electrical tilt system of claim 3, wherein the slider linkage is mounted on the control rod.

5. The remote electrical tilt system of claim 3, wherein the slider linkage is formed as a part of the control rod.

6. The remote electrical tilt system of claim 3, wherein the remote electrical tilt system includes a rail, and the control rod and the slider linkage are configured to be movable along the rail.

7. The remote electrical tilt system of claim 3, wherein the control rod is driven by the actuator.

8. The remote electrical tilt system of claim 1, wherein the remote electrical tilt system includes a plurality of phase shifters respectively mounted on at least one base plate, and the transmission mechanism is configured to drive each slide device to slide on respective phase shift circuit board.

9. The remote electrical tilt system of claim 8, wherein the transmission mechanism includes one control rod configured to drive each slide linkage for each slide device.

10. The remote electrical tilt system of claim 8, wherein the remote electrical tilt system includes a first base plate, a first phase shifter and a second phase shifter mounted on the first base plate, wherein the first phase shifter has a first slide device, the second phase shifter has a second slide device, and the first tooth section of the first slide device and the first tooth section of the second slide device face each other.

11. The remote electrical tilt system of claim 8, wherein the remote electrical tilt system includes a first base plate, at least one phase shifter mounted on the first base plate, a second base plate, and at least one phase shifter mounted on the second base plate.

12. The remote electrical tilt system of claim 1 in combination with a base station antenna.

13. A remote electrical tilt system, comprising:

an actuator;

at least one phase shifter, the phase shifter comprising:

a phase shift circuit board with conductive traces printed thereon; and a slide device with a first tooth section; and a transmission mechanism including a slider linkage configured with a second tooth section that engages the first tooth section, wherein the actuator is configured to drive the transmission mechanism, and the transmission mechanism engages the first tooth section to drive the slide device to slide on the phase shift circuit board; and wherein the slider linkage is configured to drive the slide device to slide on the phase shift circuit board.

14. The remote electrical tilt system of claim 13, wherein the slider linkage is formed in a rack shape, and the slider support is formed in a sector gear shape, thereby forming a rack-gear transmission between the slider linkage and the slider support.

15. The remote electrical tilt system of claim 13, wherein the transmission mechanism includes a control rod which is configured to drive the slider linkage.

16. The remote electrical tilt system of claim 13, wherein the remote electrical tilt system includes a plurality of phase shifters respectively mounted on at least one base plate, and the transmission mechanism is configured to drive each slide device to slide on respective phase shift circuit board.

17. The remote electrical tilt system of claim 13 in combination with a base station antenna.

* * * * *